(12) United States Patent
Bedjaoui et al.

(10) Patent No.: US 8,911,897 B2
(45) Date of Patent: Dec. 16, 2014

(54) LITHIUM MICROBATTERY PROVIDED WITH AN ELECTRONICALLY CONDUCTIVE PACKAGING LAYER

(75) Inventors: Messaoud Bedjaoui, Echirolles (FR); Steve Martin, Saint-Sauveur (FR); Raphaël Salot, Lans-en-Vercors (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 831 days.

(21) Appl. No.: 12/902,659

(22) Filed: Oct. 12, 2010

(65) Prior Publication Data

US 2011/0097625 A1 Apr. 28, 2011

(30) Foreign Application Priority Data

Oct. 26, 2009 (FR) ..................... 09 05133

(51) Int. Cl.
| | |
|---|---|
| *H01M 10/02* | (2006.01) |
| *H01M 10/04* | (2006.01) |
| *H01M 10/0585* | (2010.01) |
| *H01M 4/66* | (2006.01) |
| *H01M 2/02* | (2006.01) |
| *H01M 10/052* | (2010.01) |
| *H01M 10/0525* | (2010.01) |
| *H01M 4/134* | (2010.01) |
| *H01M 6/40* | (2006.01) |

(52) U.S. Cl.
CPC ............ *H01M 4/668* (2013.01); *H01M 2/0275* (2013.01); *H01M 10/0436* (2013.01); *H01M 10/052* (2013.01); *H01M 10/0525* (2013.01); *H01M 10/0585* (2013.01); *H01M 4/134* (2013.01); *H01M 6/40* (2013.01); *Y02E 60/122* (2013.01)
USPC ............ 429/162; 429/126; 429/163; 429/185

(58) Field of Classification Search
USPC .................. 429/163, 185, 96–100, 129–147, 429/427–255, 208
See application file for complete search history.

(56) References Cited

U.S. PATENT DOCUMENTS

| | | | |
|---|---|---|---|
| 3,353,999 A | 11/1967 | Osborn et al. | |
| 5,480,958 A * | 1/1996 | Starner et al. | ................... 528/96 |
| 6,994,933 B1 * | 2/2006 | Bates | ............................ 429/162 |

(Continued)

FOREIGN PATENT DOCUMENTS

| | | |
|---|---|---|
| EP | 2 166 609 A1 | 3/2010 |
| WO | WO 02/47187 A1 | 6/2002 |

(Continued)

*Primary Examiner* — Basia Ridley
*Assistant Examiner* — Caitlin Wilmot
(74) *Attorney, Agent, or Firm* — Oliff PLC

(57) ABSTRACT

A lithium microbattery comprises a packaging thin layer formed by a matrix of polymer material in which metallic particles are dispersed. The packaging thin layer constitutes at least a part of the anodic current collector of the lithium microbattery. The polymer material is advantageously obtained from at least a photopolymerizable precursor material chosen from bisphenol A diglycidylether, bisphenol F butanediol diglycidil ether, 7-oxabicylco[4.1.0]heptane-3-carboxylate of 7-oxabicylco[4.1.0]hept-3-ylmethyl and a mixture of bisphenol A and epichloridine. It can also be a copolymer obtained from a homogenous mixture of at least two photopolymerizable precursor materials, respectively acrylate-base, such as diacrylate 1,6-hexanediol and methacrylate, and epoxide-base, for example chosen from bisphenol A diglycidylether, 7-oxabicylco[4.1.0]heptane-3-carboxylate of 7-oxabicylco[4.1.0]hept-3-ylmethyl and a mixture of bisphenol A and epichloridine.

12 Claims, 2 Drawing Sheets

(56) References Cited

U.S. PATENT DOCUMENTS

2007/0212589 A1* 9/2007 Kobuchi et al. ................ 429/38
2009/0181303 A1 7/2009 Neudecker et al.
2010/0068617 A1 3/2010 Bedjaoui et al.

FOREIGN PATENT DOCUMENTS

| WO | WO 2006/061696 A2 | 6/2006 |
| WO | WO 2007/061928 A2 | 5/2007 |
| WO | WO 2008/011061 A1 | 1/2008 |

* cited by examiner

LITHIUM MICROBATTERY PROVIDED WITH AN ELECTRONICALLY CONDUCTIVE PACKAGING LAYER

BACKGROUND OF THE INVENTION

The invention relates to a lithium microbattery comprising a packaging thin layer made from polymer material and an anodic current collector.

STATE OF THE ART

A lithium microbattery generally comprises a stack of solid thin layers successively deposited on a substrate by conventional deposition techniques used in the microelectronics field. A lithium microbattery stack comprises in particular:
- metallic current collectors, for example made from titanium, platinum or tungsten,
- a positive electrode (or cathode) which is both an electron and ion conductor, for example made from titanium oxysulfide (TiOS), $TiS_2$ or $V_2O_5$,
- a solid electrolyte, for example UPON,
- and a negative electrode (or anode).

Depending on the nature of the anode, lithium microbatteries are in general classified according to two types of batteries:
- batteries called "Li-metal" for negative electrodes composed of metallic lithium,
- and batteries called "Li-ion" for negative electrodes formed by lithium insertion materials, for example silicon or germanium.

Furthermore, the microbattery is in general covered by at least a sealed packaging thin layer protecting the stack of above-mentioned thin layers. It is in fact well known that lithium is very sensitive to air and to humidity. A packaging thin layer therefore has to be provided in a lithium microbattery to protect the active thin layers of the lithium microbattery against possible outside environment contaminants (water, air, etc). In general, this packaging thin layer also compensates expansions of the volume of the microbattery occurring during charging and discharging cycles. Without the presence of a packaging thin layer, expansion and/or contraction of the microbattery components could in fact cause mechanical damage to the electrode containing lithium, which would result in a rapid loss of cycling capacity.

Such a packaging thin layer for a microbattery is usually in the form of a thin monolayer of organic material in order, on the one hand, to limit defects linked to the roughness of the substrate on which the stack of thin layers is arranged and, on the other hand, to facilitate accommodation of deformations of the anode when cycling of the microbattery takes place.

According to the configuration of the lithium microbattery, the packaging thin layer can be arranged directly on the anode or on the anodic current collector or on an equivalent metallic layer performing electrical connection between the anode and an anodic current collector. In all cases, it totally covers the stack of thin layers of the lithium microbattery.

Furthermore, the organic material forming the packaging thin layer is in general chosen such as to be able to fulfil its functions of packaging, of tightness with respect to external contaminants, accommodation of deformations of the microbattery, and so on. The material therefore has to present at least the following properties:
- good heat resistance (higher than 260° C.),
- very good mechanical flexibility,
- chemical compatibility and strong adherence with the active constituents of the microbattery and with lithium.

Furthermore, other layers can be associated with the packaging thin layer made from an organic material to protect the lithium microbattery, such as thin layers of dielectric materials ($Al_2O_3$, $SiO_2$, $Si_3N_4$ . . . ) or metallic layers (Ti, Cu, Al . . . ). This assembly of thin layers then forms a packaging system.

For example purposes and as illustrated in FIG. 1, in Patent application WO-A-2008/011061, a lithium battery is formed on a substrate 1 by successive stacking of a cathodic current collector 2, a cathode 3, a solid electrolyte 4 and an anodic current collector layer 5. In certain embodiments, an anode can be initially deposited between said layer 5 and solid electrolyte 4 whereas, in other embodiments, the anode will be produced in situ during the first charging of the battery. In Patent application WO-A-2008/011061, current collector layer 5 is further covered by a packaging material 6 forming the packaging thin layer and by a metallic layer 7. Metallic layer 7 is placed in contact with anodic current collector 5 by means of a via or hole 8 through packaging material 6 to ensure anodic contact connection. It is for example made from aluminium or copper and it prevents the external contaminants from migrating into the active structure of the battery. Packaging material 6 for its part enables surface defects and roughness to be smoothed out. It is for example formed by one or more layers of organic material such as a silicone, a polyimide or an epoxy.

In Patent application WO-02/47187 and as illustrated in FIG. 2, a lithium microbattery is formed by a stack of thin layers formed on a substrate 1 and successively comprising current collectors 2 and 5, a cathode 3, a solid electrolyte 4 and an anode 9. This stack of thin layers is further covered by a metallic layer 10 extending anodic current collector 5, by two thin layers 11 and 12 respectively of aluminium oxide and silicon oxide, and by a thin layer 13 of epoxy resin constituting the packaging thin layer.

OBJECT OF THE INVENTION

The object of the invention is to propose an improved lithium microbattery compared with microbatteries according to the prior art.

In particular, the object of the invention is to propose a microbattery the production whereof is simplified, with inexpensive manufacturing costs compared with the state of the technique, while at the same time being correctly protected.

According to the invention, this object is achieved by the fact that the packaging thin layer is formed by a matrix of polymer material in which metallic particles are dispersed, and by the fact that the packaging thin layer constitutes at least a part of the anodic current collector of the lithium microbattery.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
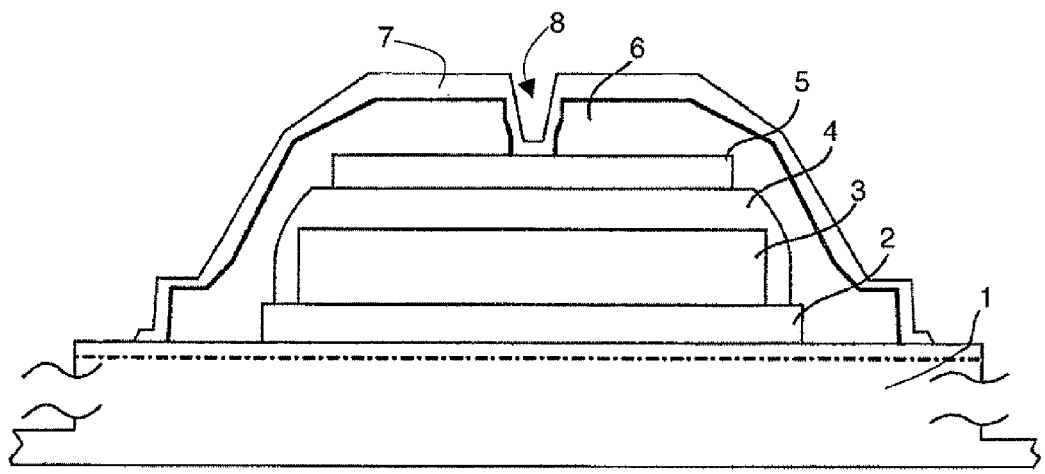
FIGS. 1 and 2 schematically represent first and second lithium micro-batteries according to the prior art.
Figure 2:
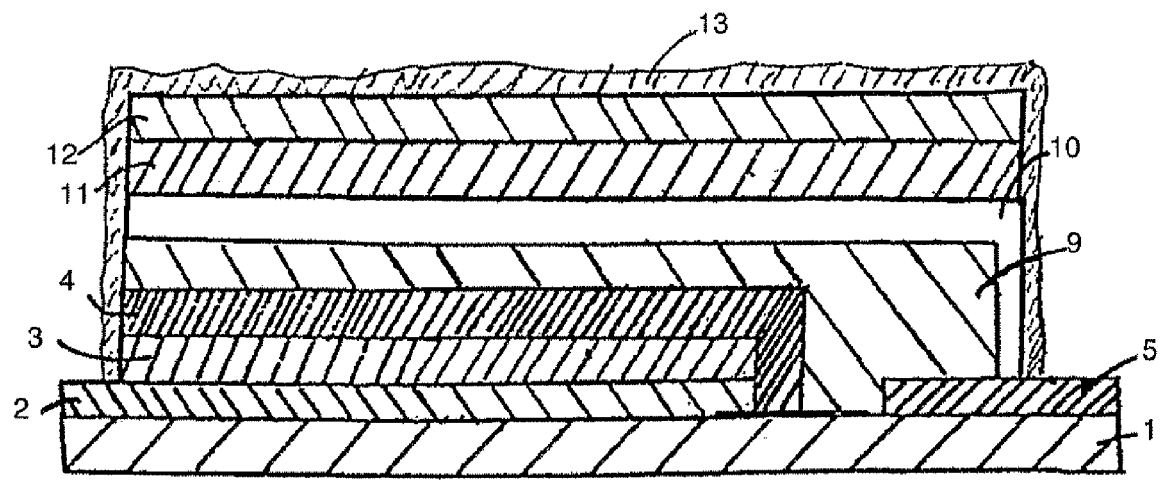
Figure 3:
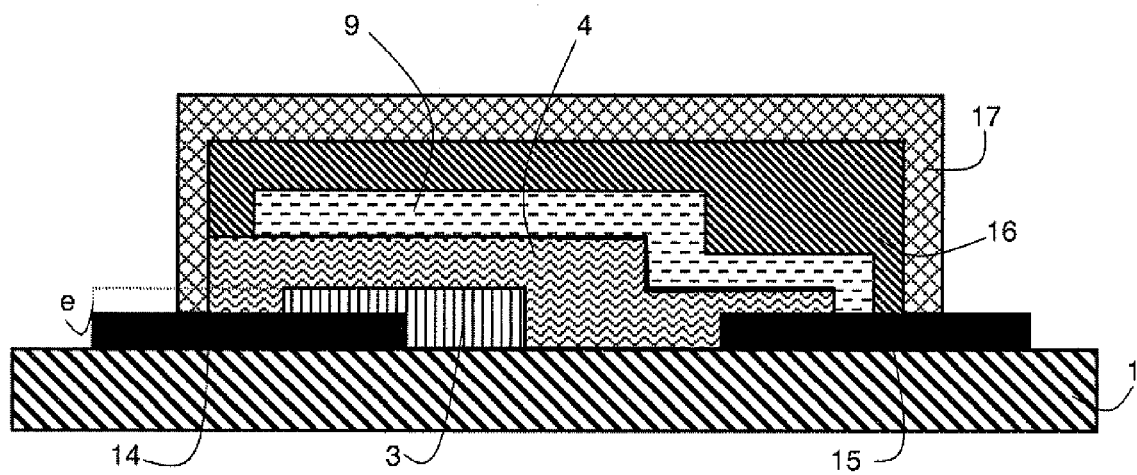
FIG. 3 illustrates, in cross-section, a particular embodiment of a lithium microbattery according to the invention.

According to an embodiment represented in FIG. 3, a lithium microbattery comprises a substrate 1 one surface whereof is partially covered by a multi-layer stack forming the active parts of the microbattery, and by at least one thin layer protecting the active parts of the microbattery.

For example, substrate 1 consists of silicon. Substrate 1 can also in certain cases contain an integrated circuit (not shown in FIG. 3) or it can in an alternative embodiment be replaced by a metallic support.

In FIG. 3, the multilayer stack forming the active parts of the microbattery successively comprises:
- two metallic thin layers 14 and 15 arranged directly on the surface of substrate 1,
- a thin layer forming the positive electrode or cathode 3,
- a solid electrolyte 4,
- and a thin layer forming the negative electrode or anode 9.

The two metallic thin layers 14 and 15 are arranged directly on the surface of substrate 1 and they are separated from one another so as not to be in contact with one another. They at least partially form the respectively cathodic and anodic current collectors of the microbattery. The two metallic thin layers 14 and 15 can for example be formed on substrate 1 by physical vapor deposition (PVD) or by chemical vapor deposition (CVD) by means of a mask enabling their shape to be determined. The two metallic thin layers 14 and 15 advantageously each have a thickness of about 200 nm. They can for example be formed by a metal chosen from titanium, platinum, tungsten and gold. In the embodiment represented in FIG. 3, metallic thin layer 14 more particularly constitutes the cathodic current collector, whereas metallic thin layer 15 forms a part of the anodic current collector.

Cathode 3, in FIG. 3, covers a part of metallic thin layer 14 and a part of the surface of substrate 1 located between the two metallic thin layers 14 and 15. Cathode 3 is advantageously in the form of a thin layer, the thickness "e" of the active part of the cathode, i.e. the part in contact with metallic thin layer 14, being about 1.5 µm. Cathode 3 is for example formed by titanium oxysulfide (TiOS), by vanadium pentoxide ($V_2O_5$) or by titanium disulfide ($TiS_2$). It can be deposited by PVD or by CVD, by mechanical masking or by photolithography.

In FIG. 3, solid electrolyte 4 covers a part of metallic thin layer 14, the whole of cathode 3, the free part of substrate 1 arranged between cathodic current collector 14 and metallic thin layer 15 and a part of metallic thin layer 15. Electrolyte 4 comprises at least a lithiated compound such as phosphorus oxynitride and lithium (known under the name of LiPON). It is advantageously in the form of a thin layer having a mean thickness of about 1.5 µm deposited for example by PVD or CVD.

Anode 9, in FIG. 3, covers most of solid electrolyte 4 and is arranged in contact with metallic thin layer 15. It is formed for example by a thin layer of metallic lithium with a thickness of about 3.5 µm deposited by evaporation through a mechanical mask.

The multilayer stack forming the active parts of the lithium microbattery is covered by a packaging thin layer 16 comprising a polymer material.

Thus, in FIG. 3, packaging thin layer 16 totally covers anode 9 and the part of solid electrolyte 4 not covered by anode 9 and a part of metallic thin layer 15. Packaging thin layer 16, like the packaging layers described in the prior art, enables the active parts of the lithium microbattery to be encapsulated and protected, in hermetically sealed manner, from air and water.

Packaging thin layer 16 is on the other hand in contact neither with cathode 3 nor with cathodic current collector 14. This packaging thin layer 16 does in fact present the particularity of having a good electronic conduction, which enables the anodic current to be collected thereby enabling an anodic contact connection to be formed. Packaging thin layer 16 thereby constitutes a part of the anodic current collector.

Thus, in the embodiment represented in FIG. 3, packaging thin layer 16, along with metallic thin layer 15, forms the anodic current collector. In other embodiments, packaging thin layer 16 could constitute the whole of the anodic current collector. Packaging thin layer 16 advantageously has a thickness comprised between about 2 µm and about 15 µm.

Producing a single thin layer or monolayer forming both the packaging thin layer and at least a part of an anodic current collector thereby simplifies production of lithium microbatteries and enables the manufacturing cost to be reduced. The use of a single thin layer acting both as packaging layer 16 and as anodic electronic conduction means provides a solution to the complex problems related to:
- relaxation of the mechanical stresses exerted on the battery partly caused by changes of volume during the charging and discharging cycles,
- planarization of the surface topology of the multilayer stack,
- bonding of the thin layers to one another,
- and electric connection on the anode side.

Electronic conduction of packaging thin layer 16 is provided by introducing metallic particles into a matrix of polymer material. The metallic particles are thus dispersed in the polymer matrix so as to significantly increase the electronic conduction.

The polymer material is more particularly chosen so as to preserve the known initial function of a packaging thin layer of polymer material, i.e. of hermetically protecting the active parts of the lithium microbattery against external contaminants and of absorbing the variation of the volume of the stack that is liable to occur during the microbattery charging/discharging cycles.

The polymer material also has to be chemically compatible with lithium and/or lithiated compounds and be compatible with the techniques implemented to produce the active parts of the microbattery. Indeed, before it is commissioned, a lithium microbattery can be subjected to several heat treatments at temperatures of about 260° C. The polymer material of the packaging thin layer consequently has to be an element that is both chemically and thermally stable for the microbattery to remain efficient. This is moreover the reason why it has not been envisaged to make the packaging thin layer with a polymer material intrinsically presenting a high electronic conduction. The use of conventional conductive polymers, such as polyacetylene, polythiophene, polypyrole, or phenylene polysulfide, does in fact prove limited for producing a lithium microbattery. These polymers are in fact difficult to implement. They can moreover be incompatible with the production steps of a lithium microbattery due to their low temperature resistance (less than 200° C.) and their high chemical reactivity with lithium and lithiated compounds.

Thus, the polymer material constituting the matrix of packaging thin layer 16 can advantageously be an aromatic polyepoxide obtained from at least a photopolymerizable precursor material such as:
- bisphenol A diglycidylether marketed by Epoxy Technology under the trade name "Epo-Tek OG142-13",
- bisphenol F butanediol diglycidil ether marketed by Epoxy Technology under the trade name "Epo-Tek OG115",
- 7-oxabicylco[4.1.0]heptane-3-carboxylate of 7-oxabicylco[4.1.0]hept-3-ylmethyl marketed by Epoxy Technology under the trade name "90-87-6",
- a mixture of bisphenol A and epichloridine (or 1-chloro-2, 3-epoxypropane) such as products OG114-4 or OG125 marketed by Epoxy Technology (the two products OG114-4 or OG125 differ by the ratio between the proportions of bisphenol A and epichloridine).

The polymer material can also be a copolymer obtained from a homogeneous mixture of at least two photopolymerizable precursor materials, respectively an acrylate-based material and an epoxide-base material. In this case, the acrylate-base material is advantageously chosen from diacrylate 1,6-hexanediol and methacrylate. The epoxide-base material is advantageously chosen from bisphenol A diglycidylether, 7-oxabicylco[4.1.0]heptane-3-carboxylate of 7-oxabicylco [4.1.0]hept-3-ylmethyl and a mixture of bisphenol A and epichloridine, for example OG114-4.

It should be noted that the term "photopolymerizable precursor material" used above, in the present application, qualifies any molecule capable of giving the polymer material in question by the action of light radiation such as ultraviolet radiation. This may therefore involve one or more monomers designed to be photopolymerized or it may involve one or more entities that have already been polymerized and are intended to be photoreticulated.

The aromatic polyepoxides and the copolymers obtained from an acrylate and an epoxide, such as those mentioned above, do in fact present the advantage of being compatible with the technology implemented to produce a lithium micro-battery. Their use moreover facilitates fabrication of the micro-battery in so far as they can advantageously be formed by application of a light radiation such as an ultraviolet radiation.

The metallic particles introduced into the organic polymer matrix can advantageously consist of at least one noble metal chosen from silver, gold and copper. Noble metals such as silver, gold and copper do in fact present the advantage of being chemically inert with respect to lithium. They are moreover metals which present a very good electrical conductivity and they are compatible with assembly methods used in the microelectronics field such as wire bonding, ball bonding and wedge bonding. The metallic particles can also consist of at least one other metal, either inoxidizable or very resistant to oxidation, such as platinum, palladium, tungsten, molybdenum, zirconium and tantalum.

Furthermore, the metallic particles introduced into the polymer material matrix advantageously have a micrometric mean diameter and even more advantageously a diameter comprised between about 1 µm and about 15 µm.

Finally, the quantity of metallic particles introduced into the polymer material matrix to form packaging thin layer 16 depends on the nature of the polymer material used, and also on the nature and dimensions of the metallic particles. In particular, packaging thin layer 16 advantageously comprises at least 80% by weight of metallic particles with respect to the weight of the materials constituting the packaging thin layer, i.e. with respect to the total weight formed by the polymer material and the metallic particles. In conventional manner, the total weight of said material is considered to be substantially equal to that of the mixture formed by the photopolymerizable precursor(s) and by the metallic particles when the polymer is obtained from one or more photopolymerizable precursor(s). Finally, the quantity of metallic particles introduced into the matrix is sufficient for the metallic particles to be in contact with one another and therefore to guarantee electronic conduction in packaging thin layer 16.

The quantity of metallic particles introduced into the polymer matrix and the size of the metallic particles are thus two important factors to be taken into account to obtain a sufficient electronic conduction and a good polymerization. They do in fact determine satisfactory dispersion of the metallic particles in the polymer material matrix and prevent the charges from accumulating in a particular area of the matrix.

The electronic conductivity obtained by introducing metallic particles into a polymer material matrix is thus $10^{13}$ to $10^{16}$ higher than the electronic conductivity of the polymer material. It has further been observed on the other hand that such an addition enables the mechanical flexibility of the polymer material matrix to be preserved. The surface topography flattening properties necessary for high-performance encapsulation of the lithium microbattery are thus ensured due to the presence of the polymer, typically of aromatic polyepoxide or epoxy- and acrylate-base copolymer type.

For example purposes, a polymer matrix formed from the epoxide OG114-4 and comprising between 80% and 90% in weight of silver particles having a mean diameter comprised between 1 µm and 15 µm presents an electronic conductivity varying between $10^6$ and $10^7$ $S \cdot m^{-1}$, whereas the same polymer matrix without metallic particles would have an electronic conductivity of about $10^{-7}$ to $10^{-8}$ $S \cdot m^{-1}$. It has further been observed that adding too great a quantity of silver particles (more than 90% in weight with respect to the total weight) to the epoxide OG114-4 makes the mixture formed in this way difficult to implement by photopolymerization.

Production of packaging thin layer 16 can thus advantageously be performed from a mixture formed by one (or more) photopolymerizable precursor(s) of the polymer material and by the metallic particles. Such a mixture, in general in the form of particles placed in suspension in a liquid solution, can then be deposited on the multilayer stack by any type of known technique. The mixture can for example be deposited:
  by serigraphy,
  by sputtering,
  by inkjet printing,
  by dip-coating,
  by micro-dispensing,
  or by spin-coating.

In the case of spin-coating, the mixture, once deposited, is solidified (or cured). This can be performed by thermal means (heat treatment at about 150° C. for 15 minutes), or advantageously by exposure to ultraviolet radiation ($\lambda$=300-500 nm) with a power density of 100 mW/cm² for 1 to 2 minutes. In the case of curing by UV radiation, the thickness of the packaging thin layer is advantageously about 8 µm to 10 µm.

For example purposes, packaging thin layer 16 represented in FIG. 3 can be produced by mixing 10 g of the photopolymerizable liquid precursor OG114-4 with 90 g of silver particles presenting a mean diameter of about 6 µm. The mixture is stirred for about 10 minutes with a stirring speed comprised between 50 and 100 rpm. The mixture is then spread on the whole of the multilayer stack, for example by a spin-coating deposition technique (3000 rpm). Ultraviolet radiation is then applied locally with a power density of 100 mW/cm², for one minute, through a mask comprising a predefined pattern. The formed packaging thin layer 16 has for example a thickness of about 10 µm.

In an alternative embodiment, packaging thin layer 16 can be produced by mixing 10 g of a solution formed by two precursors, respectively the photopolymerizable epoxide known under the name of OG114-4 and hexanediol diacrylate, with 90 g of gold particles with a mean diameter of about 3 µm. The mixture is stirred at between 50 and 100 rpm for 10 minutes. It is then deposited on the whole of the stack by spin-coating (4000 rpm) and exposure to ultraviolet radiation is performed in localized manner through a mask for 2 minutes, with a power density of 100 mW/cm². The formed packaging thin layer 16 has for example a thickness of about 8 µm.

As illustrated in FIG. 3, other thin layers can cover the multilayer stack forming the active parts of the lithium microbattery. Packaging thin layer 16 in FIG. 3 is thus covered by a barrier thin layer 17 the role whereof is to prevent water vapor diffusion. This barrier thin layer 17 can thus be of dielectric nature, advantageously with a thickness of about a hundred nanometers, deposited by PVD or CVD. It can for example be made from silica, silicon oxide, oxynitride etc. In FIG. 3, it covers the whole of the packaging thin layer and is in contact with metallic thin layers 14 and 15.

In an alternative embodiment, barrier thin layer 17 can be of metallic nature, advantageously with a thickness of 200 nm. Barrier thin layer 17 can in this case be made from titanium, tungsten, nickel, chromium or a metal alloy. It is advantageously deposited by a PVD technique or by sputtering using the same mask as that used to produce packaging thin layer 16, in this case in order to avoid contact with cathodic current collector 14.

We claim:

1. A lithium microbattery comprising:
    a cathode;
    a cathodic current collector coupled with the cathode;
    a solid electrolyte coupled with the cathode;
    an anode covering the solid electrolyte and coupled with the solid electrolyte;
    an anodic current collector coupled with the anode;
    an electrically conducting packaging layer comprised of a polymer material and of metallic particles dispersed within the matrix, the electrically conducting packaging layer covering the anode, and having no direct contact with the cathode and the cathodic current collector; and
    a barrier layer covering the electrically conducting packaging layer,
    wherein the anode is hermetically sealed by either the electrically conducting packaging layer or the barrier layer.

2. The microbattery according to claim 1, wherein the polymer material is an aromatic polyepoxide.

3. The microbattery according to claim 2, wherein the polymer material is obtained from at least a photopolymerizable precursor material selected from the group consisting of bisphenol A diglycidylether, bisphenol F butanediol diglycidil ether, 7-oxabicylco [4.1.0]heptane-3-carboxylate of 7-oxabicylco [4.1.0]hept-3-ylmethyl and a mixture of bisphenol A and epichloridine.

4. The microbattery according to claim 1, wherein the polymer material is a copolymer obtained from a homogeneous mixture of at least two photopolymerizable precursor materials, respectively an acrylate-base material and an epoxide-base material.

5. The microbattery according to claim 4, wherein the acrylate-base material is selected from the group consisting of diacrylate 1,6-hexanediol and methacrylate.

6. The microbattery according to claim 4, wherein the epoxide-base material is selected from the group consisting of bisphenol A diglycidylether, 7-oxabicylco [4.1.0]heptane-3-carboxylate of 7-oxabicylco [4.1.0]hept-3-ylmethyl and a mixture of bisphenol A and epichloridine.

7. The microbattery according to claim 1, wherein the metallic particles consist of a metal selected from the group consisting of silver, gold, copper, platinum, palladium, tungsten, molybdenum, zirconium and tantalum.

8. The microbattery according to claim 1, wherein the metallic particles have a mean diameter comprised between about 1 µm and about 15 µm.

9. The microbattery according to claim 1, wherein the electrically conducting packaging thin layer comprises at least 80% by weight of metallic particles with respect to the total weight of materials constituting the packaging thin layer.

10. The microbattery according to claim 1, wherein the electrically conducting packaging thin layer has a thickness comprised between about 2 µm and about 15 m.

11. The microbattery according to claim 1, wherein the cathodic current collector is a metallic layer.

12. The microbattery according to claim 1, wherein:
    the barrier layer has a dielectric nature,
    the barrier layer covers the whole of the electrically conducting packaging layer, and
    the barier layer is directly connected to the anodic current collector and the cathodic current collector.

* * * * *